(No Model.)

A. MESSERSMITH.
WHEEL CULTIVATOR.

No. 258,097. Patented May 16, 1882.

WITNESSES:
W. W. Hollingsworth
W. Read

INVENTOR:
A. Messersmith
BY
ATTORNEYS.

UNITED STATES PATENT OFFICE.

ALFRED MESSERSMITH, OF MUNSTER, ILLINOIS.

WHEEL-CULTIVATOR.

SPECIFICATION forming part of Letters Patent No. 258,097, dated May 16, 1882.

Application filed October 21, 1881. (No model.)

*To all whom it may concern:*

Be it known that I, ALFRED MESSERSMITH, of Munster, in the county of La Salle and State of Illinois, have invented a new and useful Improvement in Wheel-Cultivators; and I do hereby declare that the following is a full, clear, and exact description of the same, reference being had to the accompanying drawings, forming part of this specification, in which—

Figure 1:
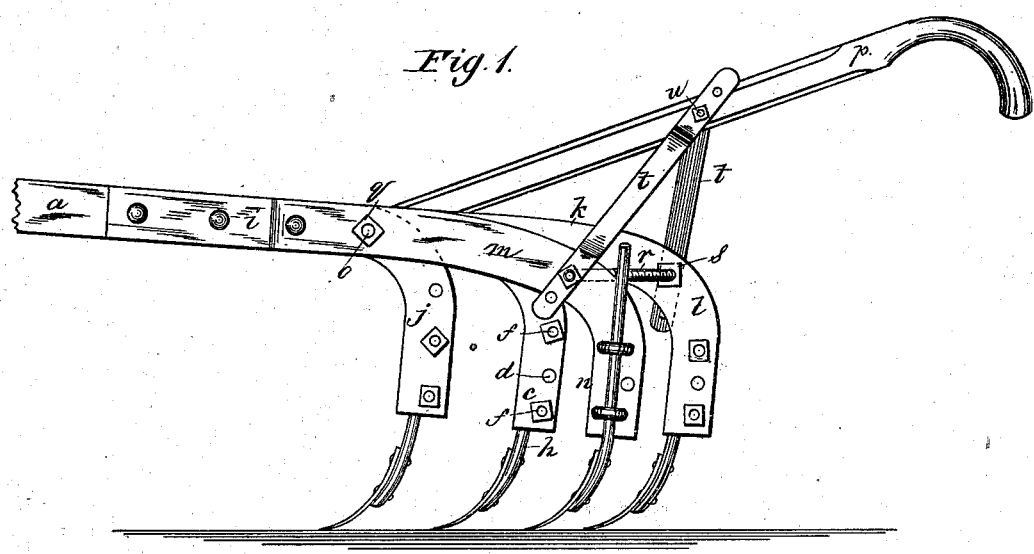
Figure 2:
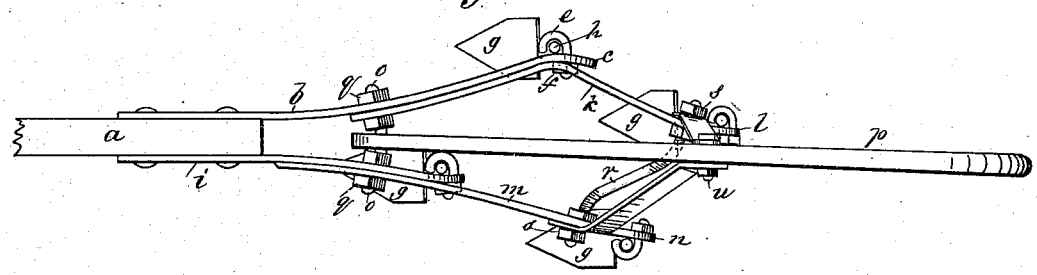

Figure 1 is a side elevation of the left-hand cultivator, showing my improved construction, and Fig. 2 is a plan view of the same.

My invention relates to improvements in wheel-cultivators; and it consists in the peculiar construction and arrangement of the parts, as hereinafter more fully set forth.

In the accompanying drawings I have represented the left-hand cultivator of a pair, the right-hand cultivator being similarly formed for the right-hand side, in which—

$a$ represents the beam of my improved cultivator, secured in the usual manner to the axle of the wheel-cultivator.

$b$ represents an arm bolted to the right-hand face of the beam $a$ near its rear end, and bent outwardly or to the right after it leaves the beam, and provided with a bent or downwardly-projecting rear end, $c$, provided with a series of adjusting-holes, $d$, adapted to receive hooks $e$, having their shanks threaded to receive nuts $f$.

$g$ represents a cultivator-tooth of the usual construction, provided with a round shank, $h$, around which the hooks $e$ pass and firmly secure the shank $h$ to the downwardly-projecting end $c$ of the arm $b$. By this construction it will be seen that the hooks can be adjusted up or down in the holes $d$, and by loosening the nuts $f$ the shank of the cultivator can be adjusted vertically, as desired to plow deep or shallow, and also that the shank can be turned as desired to vary the inclination of the cultivator-tooth; and that when these adjustments of the tooth have been made, by simply tightening the loosened nuts $f$ the shank will be held securely in place, the hooks pressing the shank against the outer face of the rear end, $c$, of the arm $b$.

$i$ represents an arm secured to the left-hand face of the beam $a$, near its rear end, by the same bolts which secure the arm $b$ to the beam. The arm $i$ is of the same construction as the arm $b$, excepting that it is shorter, and that its rear end bends outwardly or toward the left in the opposite direction from the arm $b$. The arm $i$ is provided with the downwardly-projecting rear end, $j$, provided with adjusting-holes adapted to receive hooks, through which passes the rounded shank of a cultivator-tooth of the same construction as described above for the arm $b$.

$k$ represents an arm riveted to the inner face of the arm $b$, in rear of the beam, and bent inwardly or to the left at the downward bend of the arm $b$, and is provided with a downwardly-projecting end, $l$, extending in rear of those above described, and having a cultivator-tooth provided with a round shank and hooks, as heretofore described.

$m$ represents an arm secured to the outer face of the arm $i$, and having a downwardly-projecting rear end, $n$, provided with adjusting-holes, hooks, and a cultivator-tooth with a rounded shaft similar to those above described. The arm $m$ is bent outwardly or to the left hand at its rear end. By this construction it will be seen that the four cultivator-teeth are arranged in a compact diamond or rhomb form, and that none of the teeth are in the same transverse line, and that each tooth makes a separate furrow in the forward movement of the cultivator.

$o$ represents a threaded bolt passing through holes in the arms in rear of the beam, and also through a hole in the front end of the handle $p$.

$q$ represent nuts on the bolt $o$, by means of which the arms may be laterally adjusted.

$r$ represents a threaded bolt passing diagonally through holes near the rear ends of the arms $k$ $m$, and provided with adjusting-nuts $s$, whereby the rear cultivator-teeth may be adjusted as desired. By this construction it will be seen that the threaded bolts $o$ $r$ serve the double purpose of braces for the arms and teeth, and also as a means, in connection with their nuts, of laterally adjusting the teeth as desired.

$t$ $t$ represent braces provided at their upper and lower ends with adjusting-holes, a threaded bolt, $u$, provided with a nut passing through two of the holes in the upper ends of the braces $t$ and through the plow-handle, and the threaded bolt r passing through two of the adjusting-holes in the lower end of the braces, whereby the handle may be raised or lowered, its forward end turning on the bolt o as a center.

I claim as my invention—

The combination, with the arms b c i j, secured to the opposite sides of the rear end of the plow-beam and bent outwardly, substantially as set forth, and provided with adjusting-holes in their downwardly-projecting ends, of the arms k l m n, secured to the arms b i, and bent as shown, and threaded bolts o r, serving the double purpose of braces for the arms and a means of laterally adjusting the teeth, substantially as described.

ALFRED MESSERSMITH.

Witnesses:
GEORGE HOHENSHELL,
JAS. P. BELFORD.